United States Patent
Zhang

(10) Patent No.: US 9,750,060 B2
(45) Date of Patent: *Aug. 29, 2017

(54) METHOD FOR NOTIFYING A NETWORK DOMAIN AND ACCESS POINT

(71) Applicant: HUAWEI TECHNOLOGIES CO., LTD., Shenzhen, Guangdong (CN)

(72) Inventor: Yong Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,689

(22) Filed: Apr. 19, 2016

(65) Prior Publication Data

US 2016/0234871 A1  Aug. 11, 2016

Related U.S. Application Data

(63) Continuation of application No. 13/021,054, filed on Feb. 4, 2011, now Pat. No. 9,338,804, which is a (Continued)

(30) Foreign Application Priority Data

Aug. 7, 2008  (CN) .......................... 2008 1 0041556

(51) Int. Cl.
*H04W 76/02* (2009.01)
*H04W 52/26* (2009.01)
(Continued)

(52) U.S. Cl.
CPC ............ *H04W 76/02* (2013.01); *H04W 24/06* (2013.01); *H04W 52/262* (2013.01); *H04W 88/08* (2013.01)

(58) Field of Classification Search
None
See application file for complete search history.

(56) References Cited

U.S. PATENT DOCUMENTS

| 8,019,331 B2 | 9/2011 | Khetawat |
| 2003/0123428 A1 | 7/2003 | Lakaniemi |

(Continued)

FOREIGN PATENT DOCUMENTS

| CN | 1278523 C | 10/2006 |
| CN | 1889701 A | 1/2007 |

(Continued)

OTHER PUBLICATIONS

Supplemental Notice of Allowability, dated Feb. 4, 2016, in U.S. Appl. No. 13/021,054.
(Continued)

*Primary Examiner* — Candal Elpenord
(74) *Attorney, Agent, or Firm* — Staas & Halsey LLP

(57) ABSTRACT

A method for notifying a network domain and an Access Point (AP) are disclosed to overcome the problem that User Equipment (UE) entering the AP cell is notified but a UE leaving the AP cell is not notified. The method includes: the AP receiving a service request message sent by UE; and inserting a preset voice data packet into a user plane before a conversation to indicate the user of the UE a network domain that covers the UE currently, if it is determined that a current signaling connection is a Circuit Switched (CS) connection according to the service request message.

12 Claims, 3 Drawing Sheets

Related U.S. Application Data continuation of application No. PCT/CN2009/072551, filed on Jun. 30, 2009.

(51) Int. Cl.
   *H04W 24/06* (2009.01)
   *H04W 88/08* (2009.01)

(56) References Cited

U.S. PATENT DOCUMENTS

| | | | |
|---|---|---|---|
| 2004/0014473 | A1 | 1/2004 | Ando |
| 2004/0066776 | A1 | 4/2004 | Ishidoshiro |
| 2005/0147058 | A1* | 7/2005 | Tarnanen .............. H04W 8/205 370/310 |
| 2005/0190747 | A1 | 9/2005 | Sindhwani |
| 2005/0226227 | A1 | 10/2005 | Kim et al. |
| 2006/0182235 | A1 | 8/2006 | Kraft et al. |
| 2006/0256779 | A1 | 11/2006 | Lim |
| 2006/0268837 | A1 | 11/2006 | Larsson |
| 2008/0026752 | A1 | 1/2008 | Flore |
| 2008/0139202 | A1 | 6/2008 | Wang et al. |
| 2008/0273524 | A1* | 11/2008 | Tenny ................... H04W 68/12 370/352 |
| 2011/0141890 | A1 | 6/2011 | Giaretta |

FOREIGN PATENT DOCUMENTS

| | | |
|---|---|---|
| CN | 1889789 A | 1/2007 |
| CN | 1917692 A | 2/2007 |
| CN | 101103640 A | 1/2008 |
| CN | 101115301 A | 1/2008 |
| CN | 101179756 A | 5/2008 |
| CN | 101646143 B | 2/2012 |
| EP | 2048891 A | 3/2007 |
| EP | 1914972 A2 | 4/2008 |
| JP | 2004-134874 | 4/2004 |
| WO | WO 2007/015068 | 2/2007 |
| WO | WO2007/068924 A1 | 6/2007 |
| WO | WO2008/014648 A1 | 2/2008 |

OTHER PUBLICATIONS

Supplemental Notice of Allowability, dated Jan. 29, 2016, in U.S. Appl. No. 13/021,054.
Supplemental Notice of Allowability, dated Jan. 15, 2016, in U.S. Appl. No. 13/021,054.
Notice of Allowance, dated Jan. 5, 2016, in U.S. Appl. No. 13/021,054.
Final Office Action, dated Jun. 18, 2015, in U.S. Appl. No. 13/021,054.
Office Action, dated Jan. 2, 2015, in U.S. Appl. No. 13/021,054.
Final Office Action, dated Jul. 28, 2014, in U.S. Appl. No. 13/021,054.
Office Action, dated Feb. 20, 2014, in U.S. Appl. No. 13/021,054.
Chinese Office Action issued Dec. 4, 2013 in corresponding Chinese Patent Application No. 201210025848.0.
Japanese Office Action issued Sep. 25, 2012 in corresponding Japanese Patent Application No. 2011-521425.
Written Opinion of the International Searching Authority mailed Oct. 15, 2009 issued in the corresponding International Patent Application No. PCT/CN2009/072551.
Chinese Office Action mailed May 25, 2011 issued in corresponding Chinese Patent Application No. 200810041556.X.
European Search Report dated Nov. 14, 2011 issued in corresponding European Patent Application No. 09804466.2.
U.S. Appl. No. 13/021,054, filed Feb. 4, 2011, Yong Zhang, Huawei Technologies Co., Ltd. Shenzhen, P.R. China.

\* cited by examiner

METHOD FOR NOTIFYING A NETWORK DOMAIN AND ACCESS POINT

CROSS REFERENCE TO RELATED APPLICATIONS

This application is a continuation of U.S. patent application Ser. No. 13/021,054, filed on Feb. 4, 2011, which is a continuation of International Application No. PCT/CN2009/072551, filed on Jun. 30, 2009, which claims priority to Chinese Patent Application No. 200810041556.X, filed on Aug. 7, 2008, The afore-mentioned patent applications are hereby incorporated by reference in their entireties.

FIELD OF THE INVENTION

The present invention relates to the communications field, and in particular, to a method for notifying a network domain and an Access Point (AP).

BACKGROUND OF THE INVENTION

With the development of communications technologies, AP technologies such as the Universal Mobile Telecommunication System (UMTS) AP emerges. In practical applications, an AP cell network needs to be differentiated from the existing macro network, so that a user can know the type of the network that covers the user currently, according to certain information when moving between different networks. Currently, a user is notified of the type of network that covers the user currently by sending a short message. Taking a UMTS AP as an example, the method for notification is as follows:

A simple function for sending a short message is implemented in the UMTS AR After the user enters the UMTS AP cell, the UMTS AP sends a short message to the User Equipment (UE), indicating that the user has entered the UMTS AP cell.

In the UMTS AP, the simple function for sending a short message requires the UMTS AP to support the sending and receiving of Non Access Stratum (NAS) (CP data) messages. The UMTS AP may send a short message to the UE directly, indicating the network that covers the UE currently. That is, when the UE enters the UMTS AP cell, the UMTS AP sends a location notification message to the UE after a Location Area Updating or Route Area Updating (LAU/RAU) is completed, as shown in FIG. 1.

The inventor finds at least the following problem in the prior art:

When a user talks through the UE, the user is not sure whether the user is currently located in an AP cell or macro coverage.

SUMMARY OF THE INVENTION

The embodiments of the present invention provide a method for notifying a network domain and an AP so that the user is notified of the AP cell in which the user is currently located.

The objectives of the present invention are achieved by using the following technical solution:

A method for notifying a network domain provided in an embodiment of the present invention includes:
receiving, by an Access Point (AP), a service request message sent by a UE; and
inserting, by the AP, a preset voice data packet into a user plane before a conversation to indicate the user of the UE a network domain that covers the UE currently, if it is determined that a current signaling connection is a Circuit Switched (CS) connection according to the service request message.

An AP provided in an embodiment of the present invention includes:
a receiving unit, configured to receive a service request message sent by a UE;
a judging unit, configured to judge whether a current signaling connection is a CS connection according to the service request message; and
a voice inserting unit, configured to insert a preset voice data packet into a user plane before a conversation to indicate the user of the UE a network domain that covers the UE currently if the judging unit determines that the current signaling connection is a CS connection.

In the embodiments of the present invention, for a UE that enters the cell of the AP, the AP sends a notification to the user of the UE through voice, indicating the user of the UE that the UE is in the AP cell. In this way, the user is aware of the charging policy applicable to the current conversation without causing too much interference to the user.

DETAILED DESCRIPTION OF THE EMBODIMENTS

To make the technical solution, objectives and merits of the present invention clearer, the following further describes the embodiments of the present invention in detail with reference to the accompanying drawings.

Figure 1:
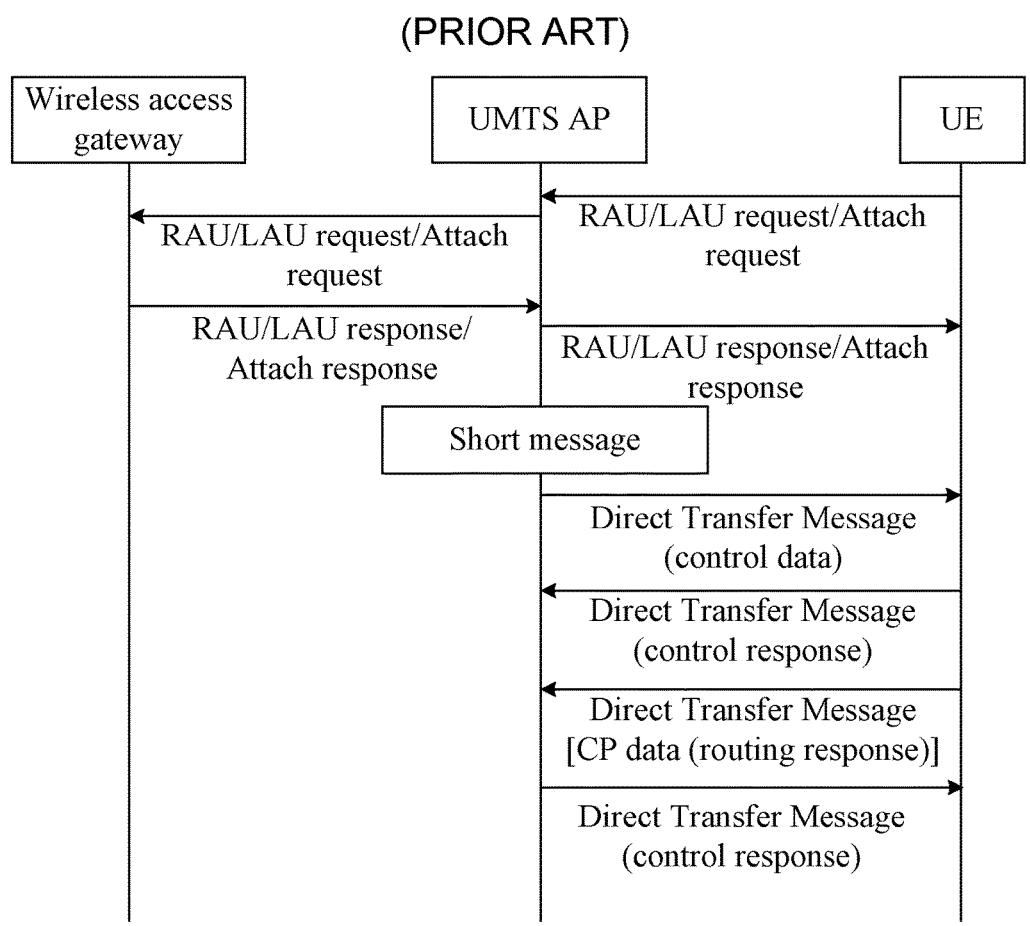
FIG. 1 shows a method for notifying a network domain through short message in the prior art.
Figure 2:
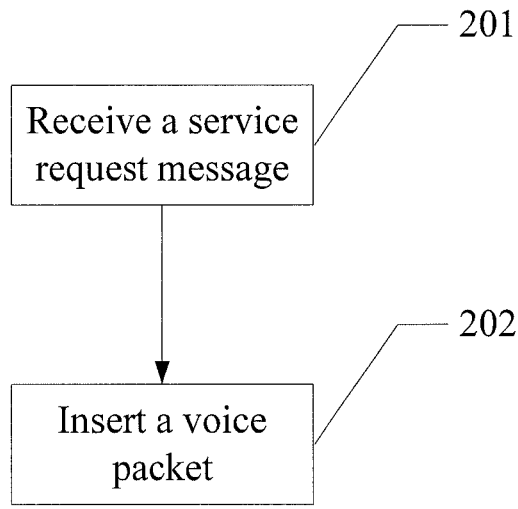
FIG. 2 is a flowchart of a method for notifying a network domain according to an embodiment of the present invention.

As shown in FIG. 2, the method for notifying a network domain provided in an embodiment of the present invention includes the following steps:

Step 201: Receive a service request message sent by a UE.

Step 202: Insert a preset voice data packet before a conversation if it is determined that a current signaling connection is a CS connection according to the service request message.

In the embodiments of the present invention, for a UE that enters the cell of the AP, the AP sends a notification to the user of the UE through voice before the conversation begins, indicating the user of the UE that the UE is in the cell of the AP. In this way, the user is aware of the charging policy applicable to the current conversation without causing too much interference to the user.

The following takes the UMTS as an example to describe the embodiments of the present invention. It is understandable to persons of ordinary skill in the art that the technical solution under the present invention is also applicable to other systems such as the Global System For Mobile Communications (GSM), Time Division-Synchronous Code Division Multiple Access (TD-SCDMA) system, Code Division Multiple Access (CDMA) 2000 system, Worldwide Interoperability for Microwave Access (WiMAX) system, and Long Term Evolution (LTE) system.

Figure 3:
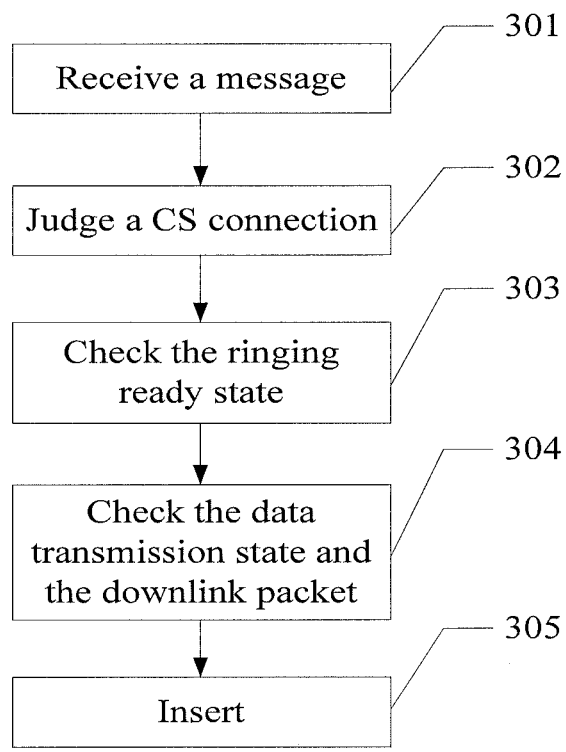
FIG. 3 is a detailed flowchart of a method for notifying a network domain according to an embodiment of the present invention.

As shown in FIG. 3, the method for notifying a network domain applied in a UMTS includes the following steps:

Step 301: The UMTS AP receives a service request message sent by a UE.

Step 302: The UMTS AP judges whether the current signaling connection is a CS connection according to the Core Network (CN) domain identity information element or a domain indicator information element in the service request message.

Step 303: If it is determined that the current signaling connection is a CS connection in step 302, the UMTS AP monitors signaling flow relevant to the state of ring of the UE after the control plane is set up to check whether the ringing of the UE on the control plane is ready.

Step 304: If the UMTS AP determines in step 303 that the ringing of the UE on the control plane is ready, the UMTS AP monitors the CS user-plane instance state to check whether the CS user-plane instance state changes to the data transmission ready state and whether a downlink packet appears on the user plane.

Step 305: When the UMTS AP in step 304 determines that the instance state of user-plane related to the CS radio access bearer changes to the data transmission ready state or that a downlink data packet appears on the user plane, the UMTS AP inserts a preset voice data packet into the user plane.

In step 302, the UMTS AP may judge whether the signaling connection is a CS connection according to the CN domain identity in an Initial Direct Transfer message sent by the UE to the UMTS AP, according to the domain indicator in an RRC Connection Request message sent by the UE to the UMTS AP, or according to the CN domain identity in a Downlink Direct Transfer message sent by the UMTS AP to the UE and the CN domain identity in an Uplink Direct Transfer message sent by the UE to the UMTS AP.

In addition, when the CS domain is in connected state, the UMTS AP indicates that the signaling connection is a CS connection, through the CN domain indicator information element in the Initial UE Message sent to the CN. Therefore, the UMTS AP may judge whether the signaling connection is a CS connection according to the CN domain indicator information element in the Initial UE Message.

In the embodiments of the present invention, for a UE that enters the cell of the AP, the AP sends a notification to the user of the UE through voice before the conversation begins between the calling party and the called party, indicating that the user of the UE that the UE is in the cell of the AP. In this way, the user is aware of the charging policy applicable to the current conversation without causing too much interference to the user.

In the embodiments of the present invention, the preset voice data packet may be obtained beforehand and stored in the AP. The preset voice data packet may be obtained by using two methods:

Method 1: The preset voice data packet may be obtained by online packet capturing:

1) Before implementation of the present invention, the peer of the UE (that is, another UE or core network) plays a voice when a UE performs a CS session before implementation of the present invention.

2) The AP obtains the voice data packet of the voice played in the previous step, and retrieves the payload corresponding to the voice data packet and stores the payload.

Method 2: An Adaptive Multi-Rate (AMR) voice generator is used to obtain the voice data packet of a desired rate.

Format-related operations are performed on the voice data packet voice data packeton two occasions: Fixed voice data packets in different formats are stored in the AP beforehand; or the voice data packet is sent in a specific format.

The format selection in the formatting of the voice data packet comes in two scenarios:

(1) The data of a corresponding format is inserted according to a result of negotiating a codec format between both parties when a service is set up. The available coding format may be determined by parsing a Transcoder-Free Operation (TrFO) negotiation message or a Tandem-Free Operation (TFO) message.

(2) The data of a corresponding format is inserted in the UMTS by using UMTS-AMR-2 of the default format.

Further, in the subsequent process of storing the voice data packet by using the method of online packet capturing, when the AP needs to insert data, the AP makes the stored payload into a voice data packet and then sends the voice data packet to the UE.

Figure 4:
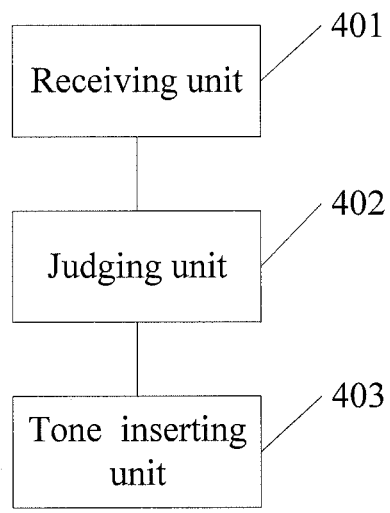
FIG. 4 shows a structure of a UMTS AP according to an embodiment of the present invention.

As shown in FIG. 4, a UMTS AP provided in an embodiment of the present invention includes: a receiving unit 401, a judging unit 402, and a voice inserting unit 403.

The receiving unit 401 is configured to receive a service request message sent by a UE.

The judging unit 402 is configured to judge whether a current signaling connection is a CS connection according to the service request message.

Specifically, the judging unit 402 is configured to judge whether the current signaling connection is a CS connection according to the service request message sent by the UE, the Direct Transfer Message between the UE and the AP, and the CN domain indicator in the UE Initial Message constructed by the AP, and etc. For the specific basis of judging, see the description in the preceding embodiment of the method for notifying a network domain.

The voice inserting unit 403 is configured to insert a preset voice data packet before a conversation if the judging unit 402 determines that the current signaling connection is a CS connection.

Figure 5:
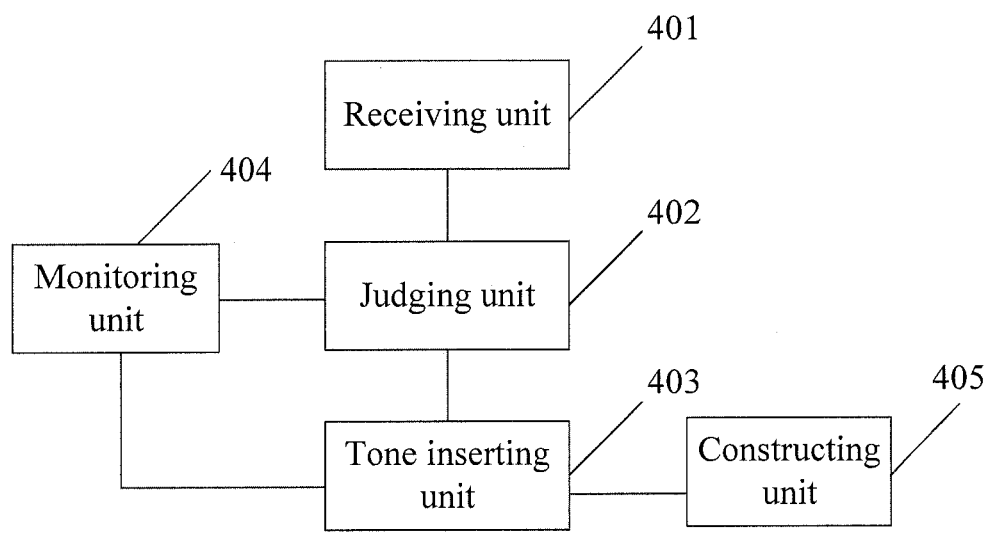
FIG. 5 shows a structure of another UMTS AP according to an embodiment of the present invention.

As shown in FIG. 5, the UMTS AP in this embodiment includes a monitoring unit 404 in addition to the receiving unit 401, the judging unit 402, and the voice inserting unit 403.

Specifically, during or after the setup of the control plane and the setup of the user plane, the monitoring unit 404 is configured to check whether the ringing of the UE on the control plane is ready if the judging unit 402 determines that the current signaling connection is a CS connection; and monitor the CS user-plane instance state to check whether the CS user-plane instance state is ready and whether a downlink data packet appears on the user plane after the ringing of the UE is detected as ready.

Specifically, the voice inserting unit 403 is configured to insert a preset voice data packet to the user plane if the monitoring unit detects that the instance state of user-plane related to the CS radio access bearer changes to the data transmission ready state or that a downlink data packet appears on the user plane.

For a UE that enters the cell of the UMTS AP in this embodiment, the UMTS AP sends a notification to the user of the UE through voice before the conversation begins between the calling party and the called party, indicating that the user is in the cell of the UNITS AP. In this way, the user is aware of the charging policy applicable to the current conversation without causing too much interference to the user.

Further, as shown in FIG. 5, the UMTS AP may include:

a constructing unit 405, configured to make a payload of a stored voice data packet into a preset voice data packet, and send the preset voice data packet to the voice inserting unit 403.

The voice inserting unit 403 is further configured to insert a preset voice data packet of the corresponding format according to the result of negotiating a codec format between both parties when a service is set up;

or, insert a preset voice data packet according to the UMTS AMR2 of the default format.

For a UE that enters the cell of the UMTS AP in this embodiment, the UMTS AP sends a notification to the user through voice before the conversation begins between the calling party and the called party, indicating that the user is in the cell of the UMTS AP. In this way, the user is aware of the charging policy applicable to the current conversation without causing too much interference to the user.

It should be noted that the AP shown in FIG. 4 and FIG. 5 may be an AP in the UMTS system, or an AP in other systems such as the GSM, TD-SCDMA system, CDMA2000 system, WiMAX system, and LTE system. Persons of ordinary skill in the art understand that all or part of the steps of the method according to any of the preceding embodiments may be implemented by a program instructing relevant hardware. The program may be stored in a computer readable storage medium. When the program runs, at least the following steps are performed:

receiving a service request message sent by a UE; and inserting a preset voice data packet before a conversation to indicate a network domain that covers the UE currently, if it is determined that a current signaling connection is a CS connection according to the service request message.

The storage medium may be a Read Only Memory (ROM), a magnetic disk, or a Compact Disk-Read Only Memory (CD-ROM).

Detailed above are a method for notifying a network domain and an AP under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for notifying a user of a User Equipment (UE) of a network domain that currently covers the UE, the method comprising:

receiving, by an Access Point (AP), a service request message to begin a voice conversation sent by the UE;

inserting, by the AP, a voice data packet into a user plane for the voice conversation for the user before beginning of the voice conversation, the voice data packet to notify the user of the UE of the network domain that currently covers the UE, in response to a determination that a current signaling connection for the voice conversation is a Circuit Switched (CS) connection according to the service request message of the UE, wherein the network domain that currently covers the UE is an AP domain of the AP.

2. The method according to claim 1, wherein:

the determination of whether the current signaling connection is a CS connection is determined by the AP according to a Core Network (CN) domain identity information element or a domain indicator information element in the service request message.

3. The method according to claim 1, the method further comprising before inserting the voice data packet into the user plane:

checking, by the AP after a control plane for the voice conversation is set up, whether ringing of the UE on the control plane is ready in response to the determination that the current signaling connection for the voice conversation is the CS connection;

checking, by the AP in response to a detection that the ringing of the UE is ready, whether a CS user-plane instance state changes to a data transmission ready state for the voice conversation and whether a downlink data packet for the voice conversation appears on the user plane, and wherein the inserting the voice data packet to the user plane is performed in response to the CS user-plane instance state changing to the data transmission ready state or the downlink data packet appears on the user plane.

4. The method according to claim 3, before the inserting the voice data packet to the user plane, the method further comprising:

constructing, by the AP, a payload of a stored voice data packet into the voice data packet.

5. The method according to claim 3, wherein the inserting the voice data packet to the user plane comprises:

inserting the voice data packet of a corresponding format according to a result of negotiating a codec format between the UE and another UE when a service of the service request message is set up.

6. The method according to claim 3, wherein the inserting the voice data packet to the user plane comprises:

inserting the voice data packet according to Universal Mobile Telecommunication System (UMTS) Adaptive Multi-Rate 2 (AMR2) of a default format.

7. An Access Point (AP), comprising:

at least one memory to store at least one program; and at least one hardware processor to instruct, including by execution of the at least one program, to:

receive a service request message to begin a voice conversation sent by a User Equipment (UE) of a user;

perform a judgment of whether a current signaling connection is a Circuit Switched (CS) connection according to the service request message; and insert a voice data packet into a user plane for the voice conversation for the user before beginning of the voice conversation, the voice data packet to notify the user of the UE of the network domain that currently covers the UE, in response to a determination that the current signaling connection for the voice conversation is a CS connection, wherein the network domain that currently covers the UE is an AP domain of the AP.

8. The AP according to claim 7, wherein:

the judgment of whether the current signaling connection is a CS connection is according to a Core Network (CN) domain identity information element or a domain indicator information element in the service request message.

9. The AP according to claim 7, wherein the at least one hardware processor further:
  checks, after the control plane for the voice conversation is set up,
    whether ringing of the UE on the control plane is ready, in response to the judgment that the current signaling connection for the voice conversation is the CS connection, and
  checks after the ringing of the UE is ready,
    whether a CS user-plane instance state changes to a data transmission ready state for the voice conversation and whether a downlink data packet for the voice conversation appears on the user plane after the ringing of the UE is ready; and
  the voice data packet to the user plane is inserted in response to the monitoring that the CS user-plane instance state changes to the data transmission ready state for the voice conversation or that a downlink data packet for the voice conversation appears on the user plane.

10. The AP according to claim 7, wherein the at least one hardware processor further:
  constructs a payload of a stored voice data packet into the voice data packet to be inserted into the user plane.

11. The AP according to claim 7, wherein:
  the voice data packet of a corresponding format is inserted according to a result of negotiating a codec format between the UE and another UE when a service for the service request message is set up.

12. The AP according to claim 7, wherein:
  the voice data packet is inserted according to Universal Mobile Telecommunication System (UMTS) Adaptive Multi-Rate 2 (AMR2) of a default format.

* * * * *